(12) United States Patent
Kishimoto

(10) Patent No.: US 9,007,640 B2
(45) Date of Patent: Apr. 14, 2015

(54) WIRELESS COMMUNICATION SYSTEM, WIRELESS COMMUNICATION DEVICE, AND COMMUNICATION CONTROL PROGRAM

(71) Applicant: Noriaki Kishimoto, Ooguchi-cho (JP)

(72) Inventor: Noriaki Kishimoto, Ooguchi-cho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/038,978

(22) Filed: Sep. 27, 2013

(65) Prior Publication Data
US 2014/0085676 A1 Mar. 27, 2014

(30) Foreign Application Priority Data
Sep. 27, 2012 (JP) ................................ 2012-213845

(51) Int. Cl.
| | | |
|---|---|---|
| H04N 1/00 | (2006.01) | |
| H04N 1/32 | (2006.01) | |
| H04W 80/00 | (2009.01) | |
| H04W 84/12 | (2009.01) | |
| H04L 29/08 | (2006.01) | |
| H04W 4/00 | (2009.01) | |

(52) U.S. Cl.
CPC ....... *H04N 1/00281* (2013.01); *H04N 1/00233* (2013.01); *H04N 1/32641* (2013.01); *H04N 1/32667* (2013.01); *H04W 80/00* (2013.01); *H04W 84/12* (2013.01); *H04L 67/12* (2013.01); *H04L 67/145* (2013.01); *H04N 2201/0015* (2013.01); *H04N 2201/0055* (2013.01); *H04N 2201/0094* (2013.01); *H04W 4/008* (2013.01)

(58) Field of Classification Search
USPC ................................ 358/1.14, 1.15, 406, 405
See application file for complete search history.

(56) References Cited

U.S. PATENT DOCUMENTS

| | | | |
|---|---|---|---|
| 2008/0024591 A1* | 1/2008 | Doi et al. ................... | 348/14.01 |
| 2009/0323108 A1* | 12/2009 | Shimma ....................... | 358/1.15 |
| 2011/0026068 A1* | 2/2011 | Yoshida ....................... | 358/1.14 |
| 2011/0122434 A1* | 5/2011 | Kim ............................. | 358/1.15 |
| 2011/0177780 A1 | 7/2011 | Sato et al. | |
| 2013/0050749 A1* | 2/2013 | Yamada ....................... | 358/1.15 |

FOREIGN PATENT DOCUMENTS

| | | |
|---|---|---|
| JP | 2007-166538 A | 6/2007 |
| JP | 2010-178002 A | 8/2010 |
| JP | 2011-146991 A | 7/2011 |

* cited by examiner

*Primary Examiner* — Allen H Nguyen
(74) *Attorney, Agent, or Firm* — Banner & Witcoff, Ltd.

(57) ABSTRACT

A wireless communication system includes: a first communication device, which has a first controller coupled to a first interface; and a second communication device, which has a second controller coupled to a second interface, wherein at least one of the first controller and the second controller is configured to perform operations comprising: transmitting data from the first communication device to the second communication device; determining whether the wireless communication connection is terminated during the data transmission; suspending the data transmission if it is determined that the wireless communication connection is terminated; determining whether another wireless communication connection is established after suspending the data transmission; and transmitting a part of the data to the second communication device via the another wireless communication if the another wireless communication connection is established, wherein the part of the data includes at least remaining data that was not received.

16 Claims, 6 Drawing Sheets

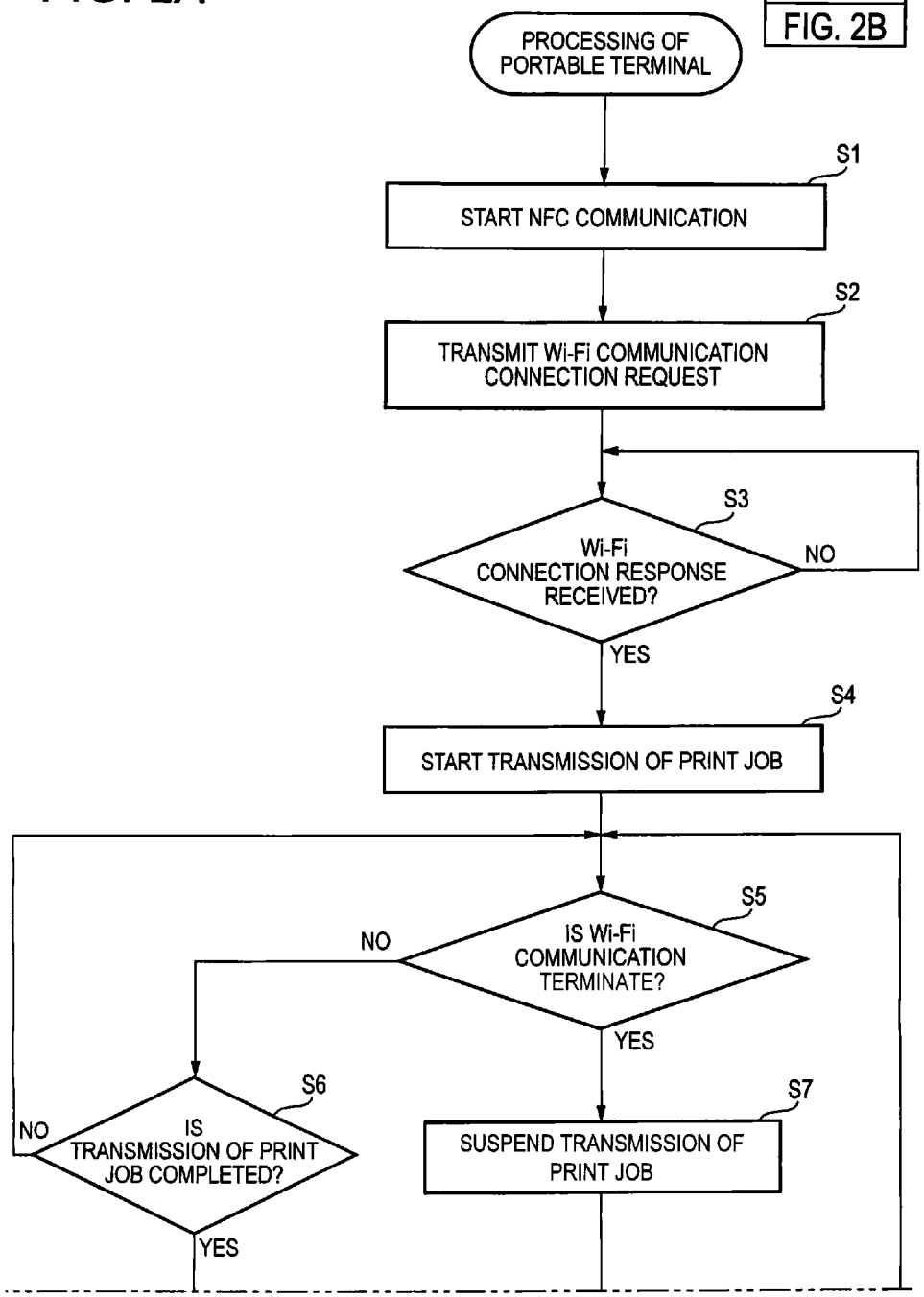

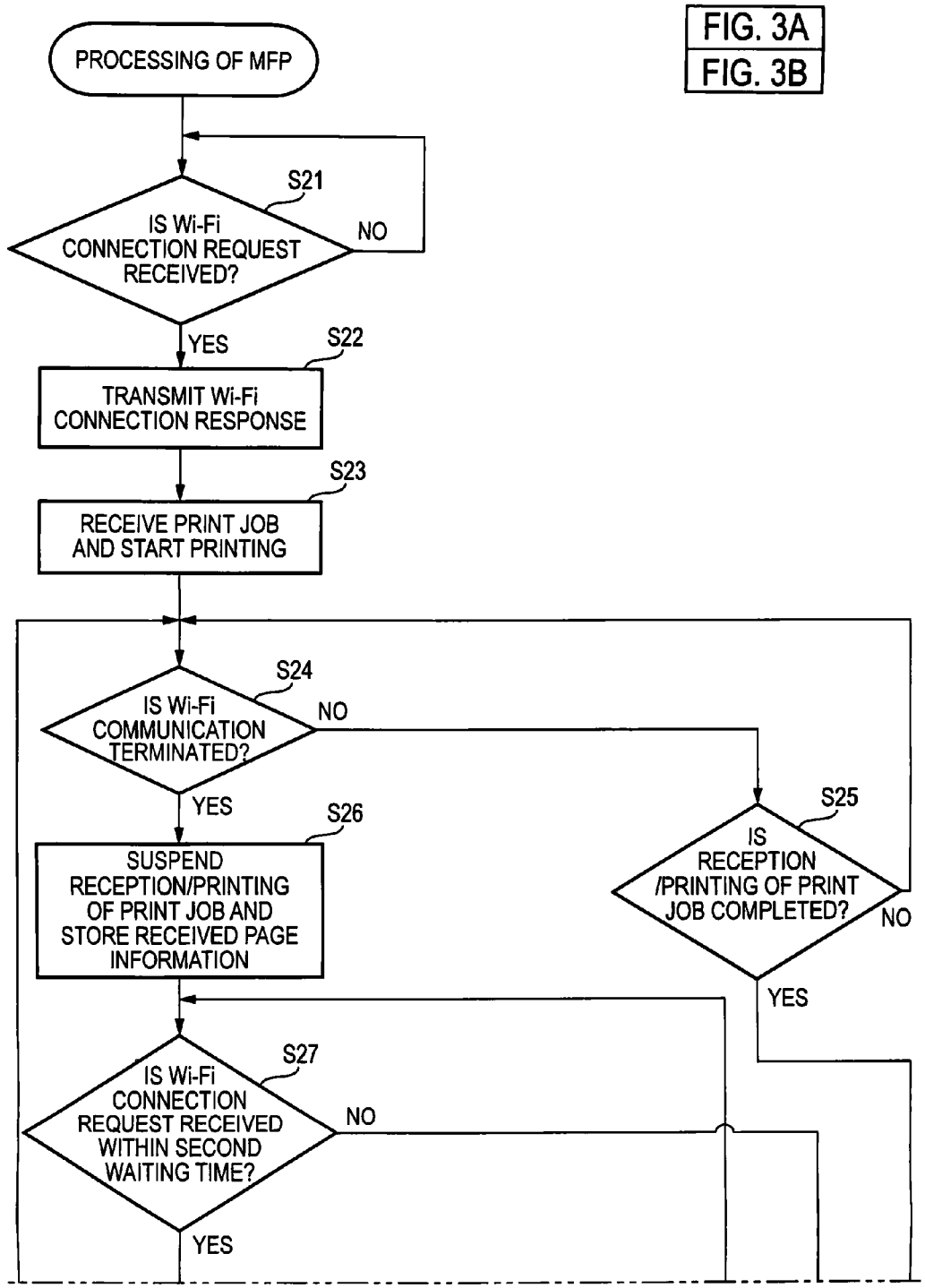

WIRELESS COMMUNICATION SYSTEM, WIRELESS COMMUNICATION DEVICE, AND COMMUNICATION CONTROL PROGRAM

CROSS-REFERENCE TO RELATED APPLICATION

This application claims priority from Japanese Patent Application No. 2012-213845 filed on Sep. 27, 2012, the entire subject matter of which is incorporated herein by reference.

TECHNICAL FIELD

This disclosure relates to the technology to perform wireless communication between a plurality of communication devices.

BACKGROUND

There is a wireless communication system which includes an initiator that is a wireless communication device of a data transmission side and a target that is a wireless communication device of a data reception side. In this wireless communication system, the initiator establishes connection of wireless communication by Bluetooth (registered trademark) with the target, completes data transmission to the target, and then terminates the wireless communication process.

SUMMARY

However, in the above wireless communication system, if wireless communication connection is terminated for some causes during transmission of data and the cutoff state continues for a predetermined time, the wireless communication device of the transmission side cancels the data transmission itself. Thereafter, if the wireless communication connection is established again, the wireless communication device of the transmission side retransmits all data from the beginning. Therefore, the data, which had been transmitted to the wireless communication device of the reception side before the data transmission is cancelled, may be wasted to cause convenience of the wireless communication to be lowered.

This disclosure discloses a technology to improve convenience of the wireless communication is disclosed as compared with the configuration that retransmits all of the data from the beginning after the data transmission is cancelled due to the cutoff of the wireless communication connection.

In this disclosure, a wireless communication system comprises: a first communication device, which has a first controller coupled to a first interface configured to perform wireless communication; and a second communication device, which has a second controller coupled to a second interface configured to perform the wireless communication. At least one of the first controller and the second controller is configured to perform operations comprising: transmitting data from the first communication device to the second communication device via the wireless communication by the first interface and the second interface after establishing a wireless communication connection between the first communication device and the second communication device; determining whether the wireless communication connection is terminated during the data transmission; suspending the data transmission if it is determined that the wireless communication connection is terminated; determining whether another wireless communication connection is established between the first communication device and the second communication device after suspending the data transmission; and transmitting a part of the data to the second communication device via the another wireless communication if it is determined that the wireless communication connection is established, wherein the part of the data includes at least remaining data that was not received by the second communication device.

If it is determined that another wireless communication connection is established after the data transmission is suspended due to the cutoff of the wireless communication connection, the wireless communication system transmits the part of the data to the second communication device. The part of the data includes at least a remaining data that was unable to be received by the second communication device due to the cutoff the wireless communication connection. Through this, convenience of the wireless communication can be improved as compared with the configuration that retransmits all of the data from the beginning after the data transmission is suspended due to the cutoff of the wireless communication connection.

On the other hand, this disclosure can be realized in various aspects, such as a wireless communication system, a wireless communication device, a method for cutting off wireless communication, a computer program for realizing functions of the method or the device, a recording medium recorded with the computer program, and the like.

According to the invention disclosed in the description, the convenience of the wireless communication can be improved as compared with the configuration that retransmits all of the data from the beginning after the data transmission is cancelled due to the cutoff of the wireless communication connection.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
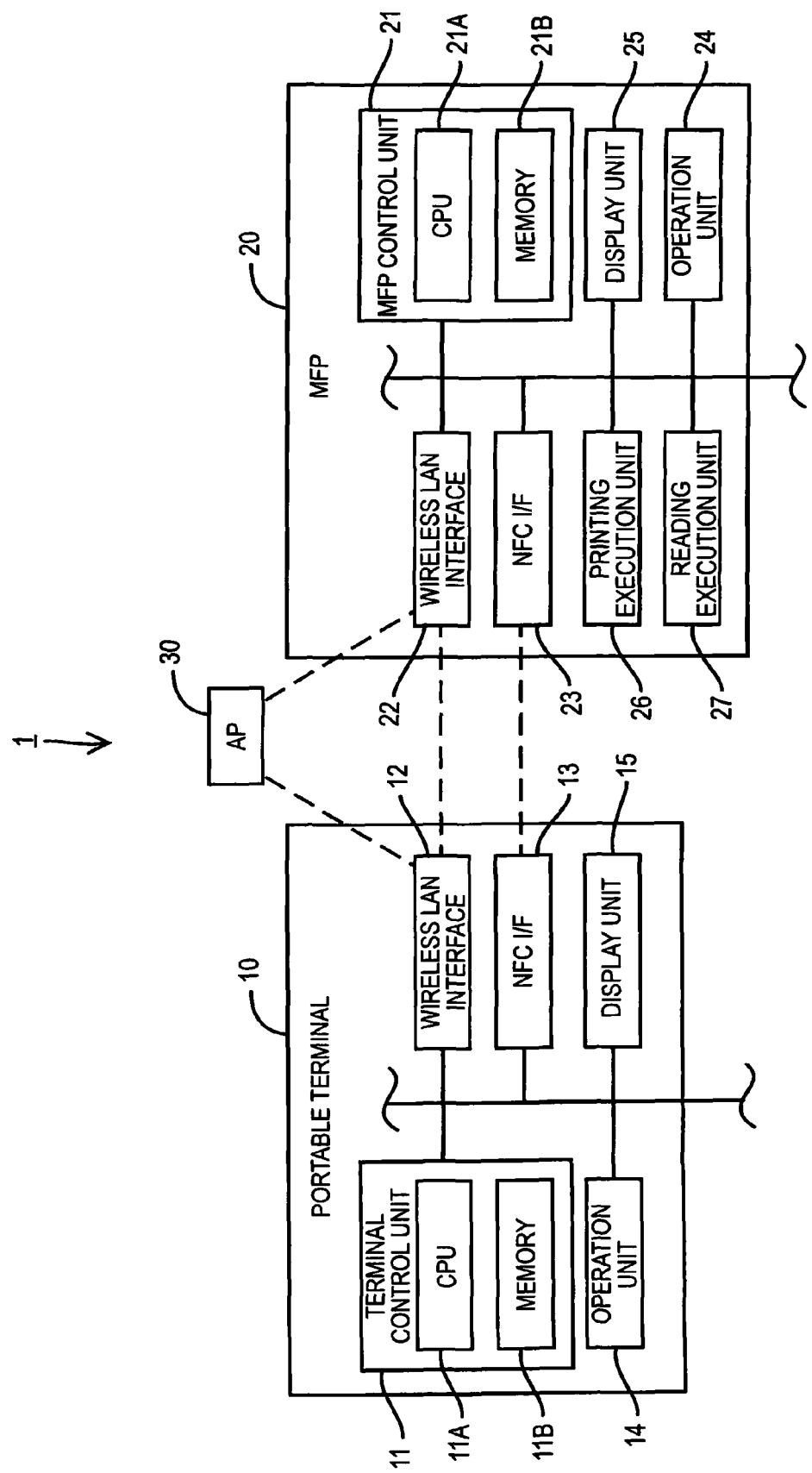
FIG. 1 is a block diagram illustrating a wireless communication system according to one embodiment.

Hereinafter, one embodiment will be described with reference to FIGS. 1 to 4. As shown in FIG. 1, a wireless communication system 1 according to this embodiment includes a portable terminal 10, a multifunction peripheral (hereinafter referred to as "MFP") 20, and an access point (hereinafter referred to as "AP") 30.

(Configuration of a Portable Terminal)

The portable terminal 10 is an example of a first communication device, and may be, for example, a portable phone (i.e., smart phone), a PDA, a notebook PC, a tablet PC, a portable music player, or a portable moving image player. The portable terminal 10 includes a terminal controller 11, a wireless LAN interface 12, an NFC interface 13, an operation unit 14, and a display unit 15.

The terminal controller 11 is an example of a first controller, and includes a central processing unit (hereinafter referred to as "CPU") 11A and a memory 11B. The memory 11B includes, for example, a ROM or a RAM. In the ROM, various kinds of programs, such as an OS, an application soft capable of preparing print data, a printer driver for controlling the MFP 20, an application soft capable of processing read data from the MFP 20, and a program for executing processing of portable terminal (an example of a communication control program) to be described later, are stored. The CPU 11A controls respective units of the portable terminal 10 according to the program read from the ROM. On the other hand, a recording medium, in which the various kinds of programs are stored, may be a CD-ROM, a hard disk drive, or a nonvolatile memory, such as a flash memory (registered trademark).

The wireless LAN interface 12 is an example of a first interface, and is an interface for the terminal controller 11 to execute wireless communication according to a Wi-Fi direct method (hereinafter referred to as "WFD method") and Wi-Fi wireless communication, such as wireless communication according to Wi-Fi. According to the WFD method, the wireless communication is performed based on 802.11 standards of IEEE (The Institute of Electrical and Electronics Engineers, Inc.) and the following standards (e.g., 802.11a, 11b, 11g, and 11n). Further, the wireless communication according to the WFD method is a direct wireless communication that does not use AP 30. In this case, the wireless communication is monopolistically possible only between the wireless devices in a one-to-one manner, and unless the wireless communication connection is terminated, the wireless communication with another wireless device is unable to be performed. The wireless communication according to general Wi-Fi is indirect wireless communication that uses AP 30. In this case, it is possible to perform the wireless communication between the wireless devices in a one-to-many manner. On the other hand, the Wi-Fi wireless communication is an example of long-distance wireless communication. In this case, the wireless communication according to the WFD method is an example of direct wireless communication, and the wireless communication according to general Wi-Fi is an example of indirect wireless communication.

The NFC interface 13 is an example of a first interface, and it is an interface through which the terminal controller 11 performs the short-distance wireless communication according to the NFC (abbreviation of Near Field Communication) method. On the other hand, the NFC wireless communication is an example of short-distance wireless communication, and it is performed based on ISO/IEC21481 or ISO/IEC18092 International Standards Organization. Further, the NFC method and the Wi-Fi method are wireless communication methods that are different from each other. The communication speed of the Wi-Fi wireless communication is higher than the communication speed of the NFC wireless communication. Further, the communicable distance of the Wi-Fi wireless communication is longer than the communicable distance of the NFC wireless communication.

The operation unit 14 includes a plurality of buttons, and it enables a user to execute various kinds of input operations. The display unit 15 includes a liquid crystal display or a lamp to display various kinds of setting screens or device operating states.

(Configuration of an MFP)

The MFP 20 is an example of a second communication device, and it includes an MFP controller 21, a wireless LAN interface 22, an NFC interface 23, an operation unit 24, a display unit 25, a printing execution unit 26, and a reading execution unit 27.

The MFP controller 21 is an example of a second controller, and it includes a CPU 21A and a memory 21B. The memory 21B includes, for example, a ROM or a RAM. In the ROM, programs for executing MFP process to be described later or programs for executing various kinds of operations of the printing execution unit 26 or the reading execution unit 27 are stored. The CPU 21A controls respective units of the MFP 20 according to the program read from the ROM. On the other hand, a recording medium, in which the various kinds of programs are stored, may be a CD-ROM, a hard disk drive, or a nonvolatile memory, such as a flash memory.

The wireless LAN interface 22 is an example of a second interface, and it is an interface for the MFP controller 21 to perform the wireless communication according to the WFD method and the wireless communication according to the general Wi-Fi. The NFC interface 23 is an example of a second interface, and it is an interface for the MFP controller 21 to perform the short-distance wireless communication according to the NFC method.

The operation unit 24 includes a plurality of buttons, and it enables a user to execute various kinds of input operations. The display unit 25 includes a liquid crystal display or a lamp to display various kinds of setting screens or device operating states. The printing execution unit 26 is an example of a function execution unit, and it is an ink jet or electrophotographic print mechanism. The printing execution unit 26 prints an image based on print data that is received from the portable terminal 10 on a print sheet (not illustrated). The reading execution unit 27 has a reading device, such as a CCD (Charge Coupled Drive image sensor) or a CIS (Contact Image Sensor), and reads an image on a document sheet (not illustrated).

(Processing of Portable Terminal)

A user of the portable terminal 10 may input instructions for starting an application program and executing printing function or scanning function to the MFP 20 through the operation unit 14. Hereinafter, a case where execution instructions of the printing function is input will be described as an example. On the other hand, during the power-on of the MFP 20, the NFC interface 23 is in a state to detect a device that can perform NFC wireless communication through generation of detection radio waves.

If the user makes the portable terminal 10 approach the MFP 20 after inputting the execution instructions of the printing function, and the distance between the portable terminal 10 and the MFP 20 becomes shorter than the distance in which the radio waves reaches between them (e.g., 10 cm), the NFC interface 13 receives the detection radio waves from the MFP 20, and transmits response radio waves to the MFP 20. Thereafter, the terminal controller 11 performs communication for establishing NFC communication connection (NFC communication session) between the portable terminal 10 and the MFP 20 in association with the MFP controller 21 of the MFP 20 through the NFC interfaces 13 and 23.

Figure 2B:
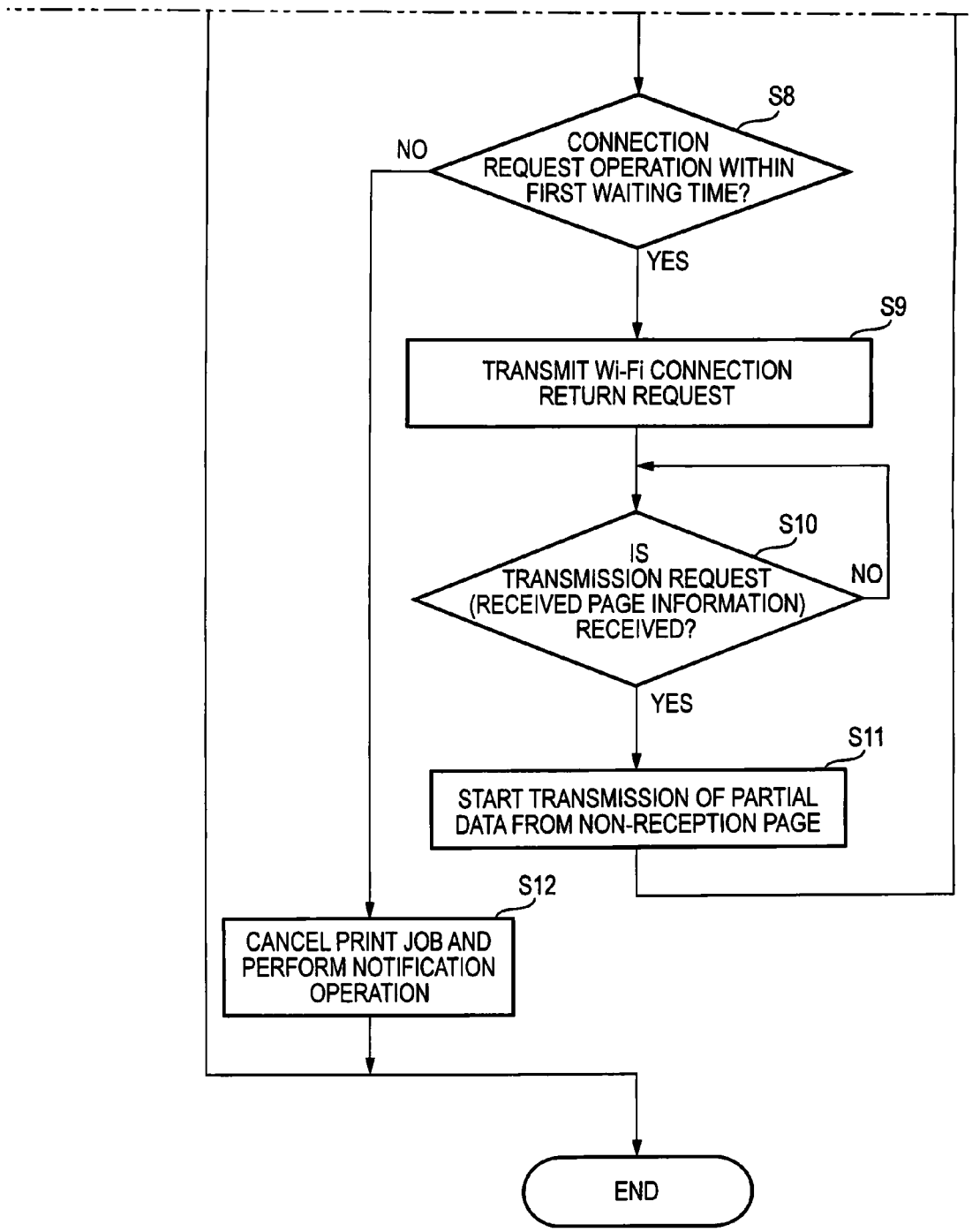
FIG. 2, which is composed of FIG. 2A and FIG. 2B, is a flowchart illustrating processing of a portable terminal.

If the NFC communication connection is established, the terminal controller 11 starts processing of portable terminal as illustrated in FIG. 2A, and starts NFC communication with the MFP 20 (S1). The terminal controller 11 transmits a Wi-Fi connection request to the MFP 20 through the NFC communication (S2). On the other hand, the Wi-Fi connection request includes Wi-Fi connection information (an example of setting information) for establishing the Wi-Fi communication connection (Wi-Fi communication session), such as identification information of the communication device of a connection request source (hereinafter referred to as "request source information"). The Wi-Fi connection information includes an SSID (Service Set Identifier) that is an identifier for identifying, for example, a communication method, an authentication method, an encryption method, and a wireless network, or a BSSID (Basic Service Set Identifier) that is the unique identifier of an access destination that constructs the wireless network. In the following description, it is assumed that any one of the WFD method and a general Wi-Fi method is set as the communication method.

After transmitting the Wi-Fi connection request, the terminal controller 11 determines whether a Wi-Fi connection response thereto is received from the MFP 20 (S3). If it is determined that the Wi-Fi connection response is not received (NO in S3), the terminal controller 11 waits, and if it is determined that the Wi-Fi connection response is received (YES in S3), the terminal controller 11 establishes the Wi-Fi communication connection between the portable terminal 10 and the MFP 20. Through this, the Wi-Fi communication connection can be efficiently established as compared with the configuration in which the user himself inputs the Wi-Fi connection information to the MFP 20 by hand. Further, the terminal controller 11 starts the data transmission processing to transmit the print job to the MFP 20 based on the execution instructions of the printing function through the Wi-Fi communication (S4). At this time, the terminal controller 11 functions as a data transmission process.

The print job includes print data and processing information. The print data is an example of data, and it is image data that is targeted for printing function. In the following description, it is assumed that the print data is image data for plural sheets. Further, the processing information includes identification information of at least one of a user and a portable terminal, data information, and processing condition information. The data information includes, for example, a data amount of the print data and the print number of sheets. The processing condition information includes, for example, various kinds of printing conditions, such as a kind of a print sheet (cardboard, normal sheet, or the like) and a printing method (one side printing, duplex printing, and plural page printing on one sheet (called Nin1 printing).

After starting the print job, the terminal controller 11 determines whether the Wi-Fi communication connection is in a cutoff state (S5). Specifically, the terminal controller 11 transmits only partial data having a predetermined unit amount, and transmits next partial data having the predetermined unit amount on the condition that the terminal controller 11 receives a response to the transmission of the partial data from the MFP controller 21. Here, if the response to the transmission of the partial data having the predetermined unit amount is not received, the terminal controller 11 repeats the transmission of the partial data. However, in the case where the response is not received even though the transmission of the partial data has been performed for a predetermined period, the terminal controller 11 determines that the Wi-Fi communication connection is in a cutoff state.

If it is determined that the Wi-Fi communication connection is in the established state (NO in S5), the terminal controller 11 determines whether the transmission of the print job, i.e. the transmission of the print data of all pages, is completed (S6), and then if it is determined that the transmission of the print job is not completed (NO in S6), the terminal controller 11 returns to S5 and continues the transmission of the print job. On the other hand, if it is determined that the transmission of the print job is completed (YES in S6), the terminal controller 11 terminates the processing of portable terminal.

On the other hand, if it is determined that the Wi-Fi communication connection is terminated (YES in S5), the terminal controller 11 suspend the transmission of the print job (S7). Specifically, the terminal controller 11 suspends the transmission of the partial data. Then, the terminal controller 11 determines whether a connection request operation is performed within a first waiting time from the cancellation of the transmission of the print job (S8). The first waiting time is an example of a predetermined time, and is, for example, 10 sec. The connection request operation is an operation for the user to transmit the Wi-Fi connection request to the MFP 20, for example, through approaching of the portable terminal 10 to the MFP 20 again.

If it is determined that the connection request operation is performed within the first waiting time (YES in S8), the terminal controller 11 determines that the Wi-Fi communication connection is established, and transmits the Wi-Fi connection request to the MFP 20 through the NFC communication as a Wi-Fi connection return request (S9). Thereafter, the terminal controller 11 determines whether the transmission request against the Wi-Fi connection return request is received from the MFP 20 (S10). The transmission request includes received page information on the page received from the MFP 20. On the other hand, non-reception page information may be transmitted instead of the received page information.

If it is determined that the transmission request is not received (NO in S10), the terminal controller 11 waits, and if it is determined that the transmission request is received (YES in S10), the terminal controller 11 determines that the Wi-Fi communication connection between the portable terminal and the MFP 20 is established again, starts the transmission of the partial data after the next page of the received page, that is, the data of the non-reception page in the MFP 20 (S11), and returns to S5.

On the other hand, if it is determined that the connection request operation is not performed within the first waiting time (NO in S8), the terminal controller 11 determines that the Wi-Fi communication connection is not to be established, cancels the print job that is targeted for current processing, performs notification operation (S12), and then terminates the processing of portable terminal. The process of canceling the print job includes a process excluding the print job from transmission candidates or deleting the print job from the memory 11B, so that the terminal controller 11 gives priority to the processing in the waiting state or communication processing with another communication device. Further, the notification process includes a process in which the terminal controller 11 notifies outside of the cancellation of the print job, by making the display unit 15 display that the print job is cancelled, for example. Through this, it is possible to suppress the influence on execution of other processes, for example, processing of the following data being unable to be carried out, due to the incompletion of the transmission of the print data that is targeted for current processing.

(Processing of the MFP)

Figure 3B:
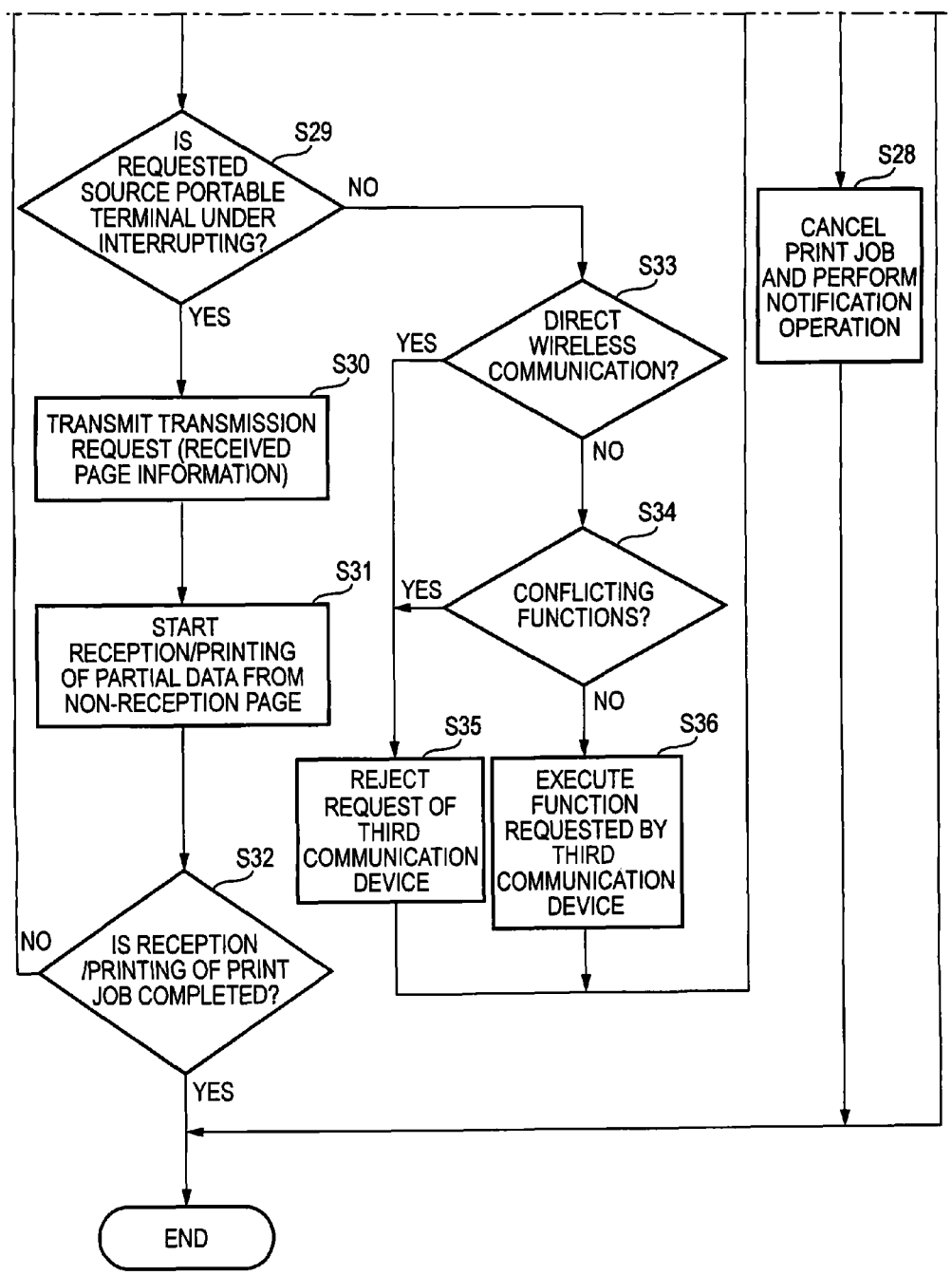
FIG. 3, which is composed of FIG. 3A and FIG. 3B, is a flowchart illustrating processing of an MFP.

If the user makes the portable terminal 10 approach the MFP 20, and the NFC interface 23 receives the response radio waves from the portable terminal 10 and the MFP controller 21 performs communication for establishing the NFC communication connection (NFC communication session) between the portable terminal 10 and the MFP 20, the MFP controller 21 executes the processing of the MFP as shown in FIG. 3A.

If it is determined that the Wi-Fi connection request is not received from the portable terminal 10 (NO in S21), the MFP controller 21 waits, and if it is determined that the Wi-Fi connection request is received (YES in S21), the MFP controller 21 transmits the Wi-Fi connection response to the portable terminal 10 through the NFC communication (S22), and starts the reception of the print job from the portable terminal 10 (S23). Further, the MFP controller 21 starts the printing based on the received print data (S23).

The MFP controller 21 determines whether the Wi-Fi communication connection is terminated (S24) after starting the reception of the print job. Specifically, if it is determined that the non-reception state in which the print data is not transmitted from the portable terminal 10 continues over a prescribed period, the MFP controller 21 determines that the Wi-FI communication connection is terminated.

If it is determined that the Wi-Fi communication connection is established (NO in S24), the MFP controller 21 determines whether the reception and printing of the print job, that is, reception and printing of the print data of all pages, are completed (S25), and if it is determined that the reception and printing of the print data are not completed (NO in S25), the MFP controller 21 returns to S24 and continues the reception and printing of the print job. By contrast, if it is determined that the reception and printing of the print data are completed (YES in S25), the MFP controller 21 terminates the processing of the MFP.

On the other hand, if it is determined that the Wi-Fi communication connection is terminated (YES in S24), the MFP controller 21 suspends the reception and printing of the print job (S26). Further, the MFP controller 21 stores the number of pages of the print data, of which the reception is completed at this time, for example, in the memory 21B as the received page information. Further, the MFP controller 21 determines whether the Wi-Fi connection request is received within the second waiting time from the suspending of the reception of the print job (S27). The second waiting time is, for example, 10 min. It is preferable that the second waiting time is the time that is enough for the user who carries the portable terminal 10 to come back to the MFP 20, and it is preferable that the second waiting time is shorter than the first waiting time.

If it is determined that the Wi-Fi connection request is not received within the second waiting time (NO in S27), the MFP controller 21 determines that the Wi-Fi communication connection is not established, cancels the print job that is targeted for current processing, performs notification operation (S28), and then terminates the processing of the MFP. The process of canceling the print job includes a process excluding the print job from print candidates or deleting the print job from the memory 11B, so that the MFP controller 21 gives priority to the processing in the waiting state or the communication processing with a third communication device. Further, the notification process includes a process in which the MFP controller 21, for example, makes the display unit 25 display that the print job is cancelled or notifies outside of the cancellation of the print job. Through this, it is possible to suppress the influence on execution of other processes, for example, processing of the following data being unable to be carried out, due to the incompletion of the reception of the print data that is targeted for current processing.

On the other hand, if it is determined that the Wi-Fi connection request is received within the second waiting time (YES in S27), the MFP controller 21 determines that the Wi-Fi communication connection is established, and then determines whether the request source of the Wi-Fi connection request is the portable terminal 10 in which the reception of the print job is suspended in S26 (S29). Specifically, if request source information, which is included in the Wi-Fi connection request received in S21 before the suspending, coincides with request source information, which is included in the Wi-Fi connection request received in S27, the MFP controller 21 determines that the request source of the Wi-Fi connection request received in S27 is the portable terminal 10, and if not, the MFP controller 21 determines the request source is the third communication terminal except for the portable terminal 10.

If it is determined that the request source of the Wi-Fi connection request in S27 is the portable terminal 10 (YES in S29), the MFP controller 21 transmits the transmission request that includes the received page information stored in the memory 21B to the portable terminal 10 through the NFC communication (S30). Thereafter, if it is determined that the Wi-Fi communication connection between the portable terminal 10 and the MFP 20 is established again, the MFP controller 21 starts the reception and printing of the data of the pages, which are not received due to the suspending of the reception, through the Wi-Fi communication (S31). Thereafter, if it is determined that the reception and printing of the print job is not completed (NO in S32), the MFP controller 21 returns to S24, and it continues the reception and printing of the print job. By contrast, if it is determined that the reception and printing of the print job is not completed (YES in S32), the MFP controller 21 terminates the processing of the MFP.

On the other hand, if it is determined that the request source of the Wi-Fi connection request in S27 is the third communication device (NO in S29), the MFP controller 21 determines whether the communication method that is designated in the Wi-Fi connection request is the WFD method, that is, the direct wireless communication (S33). If it is determined that the communication method is the direct wireless communication (YES in S33), the MFP controller 21 rejects the Wi-Fi connection request by the third communication device (S35), for example, the MFP controller 21 transmits a rejection notification to the third communication device, and terminates the processing of the MFP. Through this, it is possible to suppress the occurrence of the situation where the transmission of the non-reception data from the portable terminal 10 becomes impossible due to the monopoly of the wireless communication with the MFP 20 by the other communication device.

In S33, if it is determined that the communication method is the general Wi-Fi method, that is, the indirect wireless communication (NO in S33), the MFP controller 21 determines whether a function, of which the execution is requested by the third communication device with respect to the MFP 20, and a function (printing function) that is suspended in S26 are conflicted with each other and are unfeasible at the same time (S34). The MFP controller 21 may receive information on the function requested by the third communication device from the third communication device, for example, through the NFC communication. For example, the same functions are to be functions conflicting with each other. By contrast, the printing function and the scanning function are not to be functions conflicting with each other. However, the printing function or the scanning function and the copying function may be conflicted.

If it is determined that the functions conflict with each other (YES in S34), the MFP controller 21 rejects the Wi-Fi connection request by the third communication device (S35), returns to S27, and waits for the reception of the next Wi-Fi connection request. Through this, it is possible to suppress the occurrence of the situation where the function with respect to the non-reception data from the portable terminal 10 is unable to be executed due to the execution of the requested function by the third communication device. On the other hand, the MFP controller 21 may be configured to accept the Wi-Fi communication connection request, but it does not execute the requested function, instead of refusing the Wi-Fi connection request by the third communication device.

By contrast, if it is determined that the functions do not conflict with each other (NO in S34), the MFP controller 21 accepts the Wi-Fi connection request of the third communication device, establishes the Wi-Fi communication connection with the third communication device, executes the requested function (S36), and returns to S27 to wait for the reception of the next Wi-Fi connection request. Through this, if the function requested by the third communication device does not conflict with the function that is suspended in S26, even if the third communication device executes the requested function, the situation where the function with respect to the non-reception data from the portable terminal 10 is unable to be executed does not occur. Further, it is possible to suppress the refusing of other functions requested by the third communication device due to the suspending of the function in S26.

(Specific Sequence)

Figure 4:
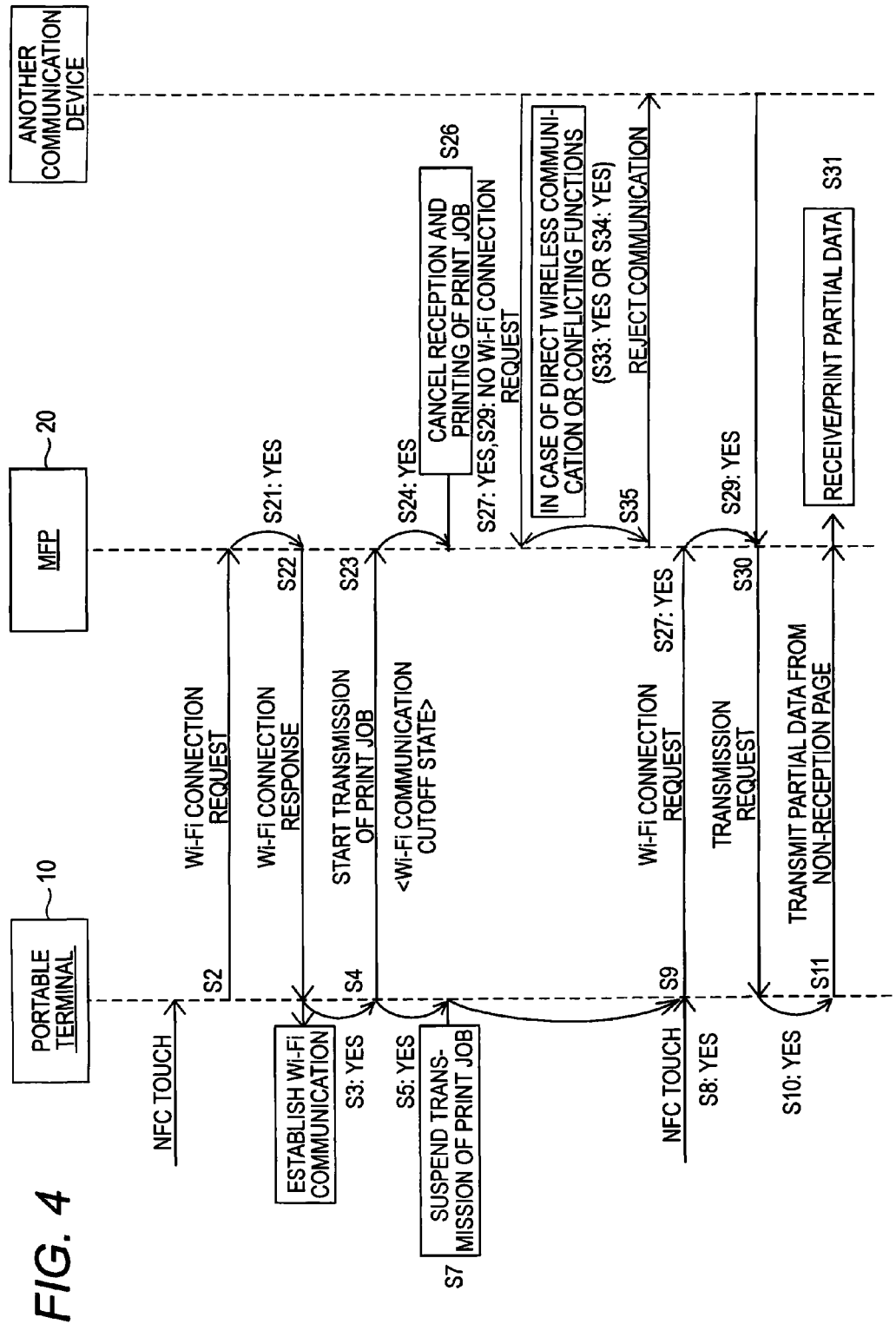
FIG. 4 is a diagram of a sequence in a cutoff state after establishment of Wi-Fi communication connection.

As illustrated in FIG. 4, if the Wi-Fi communication connection is terminated while the portable terminal 10 is transmitting the print job (S4) after the Wi-Fi communication connection is established, the portable terminal 10 determines that the Wi-Fi communication connection is terminated (YES in S5), and then suspends the transmission of the print job (S7). Further, MFP 20 also determines that the Wi-Fi communication connection is terminated (YES in S24), and then suspends the reception and printing of the print job (S26).

Even in the case where the third communication device transmits the Wi-Fi connection request to the MFP 20 during the suspending (YES in S27, and NO in S29) If the wireless communication method of the Wi-Fi connection request is the direct wireless communication, or if the function, of which the execution is requested by the third communication device, conflicts with the function that is currently suspended (YES in S33 or YES in S34), a rejection notification is sent to the third communication device. Through this, even when the Wi-Fi communication connection between the portable terminal 10 and the MFP 20 is established again, it is possible to suppress the influence on the transmission of the partial data due to the communication with the third communication device.

If the connection request operation is performed by the NFC touch in the portable terminal 10 that is currently in the suspending (YES in S8), the portable terminal 10 transmits the Wi-Fi connection request to the MFP 20 (S9). In response, the MFP 20 transmits the transmission request to the portable terminal (S29: YES in S30). If the transmission request is received (YES in S10), the portable terminal 10 starts the transmission of the partial data from the non-reception page (S11), and the MFP 20 starts the reception and printing of the partial data (S31).

(Effects of this Embodiment)

If it is determined that the Wi-Fi communication connection is established after the data transmission is suspended due to the cutoff of the Wi-Fi communication connection, the wireless communication system 1 transmits the partial data to the MFP 20. The partial data, which is a component of the data, includes at least a part that was unable to be received by the MFP 20. Through this, the convenience of the wireless communication can be improved as compared with the configuration that retransmits all of data from the beginning after the data transmission is cancelled due to the cutoff of the wireless communication connection.

<Another Embodiment>

The technology disclosed in the description is not limited to the embodiment as explained above by the description and the drawings, but includes, for example, various aspects as follows.

"The first communication device" is not limited to the portable terminal 10, but may be a personal computer or a server.

In the above-described embodiment, the terminal controller 11 and the MFP controller 21 are configured to execute the respective processes of FIGS. 2 and 3 through the CPU. However, the configuration of the terminal controller 11 and the MFP controller 21 is not limited thereto, but the terminal controller 11 and the MFP controller 21 may be configured to execute the respective processes in FIGS. 2 and 3 through the plurality of CPUs, through a hard circuit, such as an ASIC (Application Specific Integrated Circuit), only, or through the CPU and the hard circuit.

The wireless LAN interfaces 12 and 22 may be configured to execute only any one of the wireless communication according to the Wi-Fi direct method (hereinafter referred to as "WFD method") and the wireless communication according to the general Wi-Fi. Further, "the first interface and the second interface" may be interfaces for executing infrared communication, Bluetooth (registered trademark), and Transfer Jet in addition to the Wi-Fi wireless communication or the NFC wireless communication.

"The second communication device" is not limited to the MFP that can execute the printing function and the scanning function, but it may be a printer that can execute only the printing function or a scanner that can execute only the scanning function. Further, "the second communication device" may be a device (e.g., a PC, a server, a portable phone, or a smart phone) that executes a function that is different from the printing function or the scanning function (e.g., image display function, data operation function, or facsimile function).

"The function execution unit" is not limited to the printing execution unit 26 or the reading execution unit 27, but it may be a unit that executes the processing based on data or a unit that executes, for example, the image display function and the data operation function.

In the above-described embodiments, the terminal controller 11 is configured to determine whether the Wi-Fi communication connection is terminated based on the existence/nonexistence of a response from the MFP 20 with respect to the transmission of the print data. However, the configuration of the terminal controller 11 is not limited thereto, and the terminal controller 11 may be configured to determine that the Wi-Fi communication connection is terminated if it is determined that the reception level of the detection radio waves generated by the AP or the MFP 20 is equal to or lower than the reference level or it is determined that the data transmission amount per unit time or the transmission speed is equal to or lower than the threshold value.

In the above-described embodiments, the MFP controller 21 is configured to determine whether the Wi-Fi communication connection is terminated based on the existence/nonexistence of the transmission of the print data from the portable terminal 10 in S24. However, the configuration of the MFP controller 21 is not limited thereto, and the MFP controller 21 may be configured to determine that the Wi-Fi communication connection is terminated if it is determined that the reception level of the detection radio waves generated by the AP is equal to or lower than the reference level or it is determined that the data reception amount per unit time or the transmission speed is equal to or lower than the threshold value.

The MFP controller 21 may be configured to reject the connection request of the third communication device without performing the determination in S33 and S34 if it is determined that the request source of the Wi-Fi connection request in S27 is the third communication device (NO in S29). Through this, even when the Wi-Fi communication is established again, it is possible to suppress the influence on the transmission of the partial data due to the communication with the third communication device. Further, the MFP controller 21 may be configured to execute only one of S33 and S34.

In the above-described embodiments, if it is determined that the transmission request is received (YES in S10), the terminal controller 11 is configured to transmit the partial data from the next page of the received page of the print data (S11). However, in order to suppress a missing page, the terminal controller 11 may be configured to transmit the partial data from the page before several pages of the received page of the print data to the MFP 20. Further, the terminal controller 11 may be configured to store information on the non-transmission page determined not to be able to be transmitted in the memory 11b based on the existence/nonexistence of the response to the transmission and to transmit the partial data from the non-transmission page of the print data to the MFP 20 in S11. In this case, the terminal device 10 needs not receive the page information received from the MFP 20.

What is claimed is:

1. A wireless communication system comprising:
    a first communication device, which has a first controller coupled to a first interface configured to perform wireless communication; and
    a second communication device, which has a second controller coupled to a second interface configured to perform the wireless communication,
    wherein at least one of the first controller and the second controller is configured to perform operations comprising:
        data transmission including transmitting data from the first communication device to the second communication device via the wireless communication performed by the first interface and the second interface after establishing a wireless communication connection between the first communication device and the second communication device;
        determining whether the wireless communication connection is terminated during the data transmission;
        suspending the data transmission if it is determined that the wireless communication connection is terminated;
        determining whether another wireless communication connection is established between the first communication device and the second communication device after suspending the data transmission; and
        transmitting a part of the data to the second communication device via the other wireless communication if it is determined that the other wireless communication connection is established, wherein the part of the data includes at least remaining data that was not received by the second communication device.

2. The wireless communication system according to claim 1,
    wherein the at least one of the first controller and the second controller is further configured to perform operations comprising:
        determining whether the other wireless communication connection is established within a predetermined time after suspending the data transmission; and
        canceling the data transmission, if it is determined that the other wireless communication connection is not established within the predetermined time.

3. The wireless communication system according to claim 1,
    wherein the at least one of the first controller and the second controller is further configured to perform operations comprising:
        determining whether either the first communication device or the second communication device receives a communication request from a third communication device during a suspension of the data transmission; and
        rejecting the communication request from the third communication device, if it is determined that either the first communication device or the second communication device receives the communication request from the third communication device during the suspension of the data transmission.

4. The wireless communication system according to claim 3,
    wherein the second communication device has a function execution unit configured to execute a plurality of functions, and
    wherein the at least one of the first controller and the second controller is further configured to perform operations comprising:
        determining whether a first function requested by the communication request from the third communication device, and a second function executed based on the data, of which the data transmission is suspended, can be executed simultaneously; and
        accepting the communication request if it is determined that both of the first function and the second function can be executed simultaneously.

5. The wireless communication system according to claim 3,
    wherein the first interface and the second interface are configured to perform indirect wireless communication via an access point and direct wireless communication without the access point, and
    wherein the at least one of the first controller and the second controller is further configured to perform operations comprising:
        determining whether the communication request is a connection request for the indirect wireless communication or a connection request for the direct wireless communication;
        accepting the communication request if it is determined that the communication request is the connection request for the indirect wireless communication; and
        rejecting the communication request if it is determined that the communication request is the connection request for the direct wireless communication.

6. The wireless communication system according to claim 1,
    wherein the first interface and the second interface are configured to perform short-distance wireless communication and long-distance wireless communication having a longer communicable distance than the short-distance wireless communication, and
    wherein the at least one of the first controller and the second controller is further configured to perform operations comprising:

transmitting setting information from the first communication device to the second communication device by the short-distance wireless communication between the first communication device and the second communication device; and establishing a long-distance wireless communication connection between the first communication device and the second communication device by using the transmitted setting information.

7. A wireless communication device receiving data from an external device, comprising:
an interface performing wireless communication; and
a controller, wherein the controller is configured to perform operations comprising:
data reception including receiving the data from the external device via the wireless communication performed by the interface, after establishing a wireless communication connection between the wireless communication device and the external device;
determining whether the wireless communication connection is terminated during the data reception;
suspending the data reception if it is determined that the wireless communication connection is terminated;
determining whether another wireless communication connection is established between the wireless communication device and the external device after suspending the data reception; and
receiving a part of the data from the external device via the other wireless communication if it is determined that the other wireless communication connection is established, wherein the part of the data includes at least remaining data that was not received by the wireless communication device.

8. A non-transitory computer-readable medium storing instructions that, when executed, cause a wireless communication device having an interface for performing wireless communication to perform operations comprising;
data transmission including transmitting data from the wireless communication device to an external device via the wireless communication performed by the interface after establishing a wireless communication connection between the wireless communication device and the external device;
determining whether the wireless communication connection is terminated during the data transmission;
suspending the data transmission if it is determined that the wireless communication connection is terminated;
determining whether another wireless communication connection is established between the wireless communication device and the external device after suspending the data transmission; and
transmitting a part of the data to the external device via the other wireless communication if it is determined that the other wireless communication connection is established, wherein the part of the data includes at least remaining data that was not received by the external device.

9. The wireless communication device according to claim 7, wherein the controller is further configured to perform operations comprising:
determining whether the other wireless communication connection is established within a predetermined time after suspending the data reception; and
canceling the data reception, if it is determined that the other wireless communication connection is not established within the predetermined time.

10. The wireless communication device according to claim 7, wherein the wireless communication device is configured to receive a communication request from another external device during a suspension of the data reception, and
wherein the controller is further configured to reject the communication request from the other external device, if it is determined that the wireless communication device receives the communication request from the other external device during the suspension of the data reception.

11. The wireless communication device according to claim 10,
wherein the wireless communication device has a function execution unit configured to execute a plurality of functions, and
wherein the controller is further configured to perform operations comprising:
determining whether a first function requested by the communication request from the other external device, and a second function executed based on the data, of which the data reception is suspended, can be executed simultaneously; and
accepting the communication request if it is determined that both of the first function and the second function can be executed simultaneously.

12. The wireless communication device according to claim 10,
wherein the interface is configured to perform indirect wireless communication via an access point and direct wireless communication without the access point, and
wherein the controller is further configured to perform operations comprising:
determining whether the communication request is a connection request for the indirect wireless communication or a connection request for the direct wireless communication;
accepting the communication request if it is determined that the communication request is the connection request for the indirect wireless communication; and
rejecting the communication request if it is determined that the communication request is the connection request for the direct wireless communication.

13. The wireless communication device according to claim 7,
wherein the interface is configured to perform short-distance wireless communication and long-distance wireless communication having a longer communicable distance than the short-distance wireless communication, and
wherein the controller is further configured to perform operations comprising:
receiving setting information from the external device by the short-distance wireless communication between the wireless communication device and the external device; and
establishing a long-distance wireless communication connection between the wireless communication device and the external device by using the received setting information.

14. The wireless communication device according to claim 7, further comprising a printing execution unit,
wherein the controller is configured to perform operations comprising causing the printing execution unit to print based on the received data.

15. The non-transitory computer-readable medium according to claim 8, wherein the instructions, when executed, cause the wireless communication device to perform further operations comprising:
- determining whether the other wireless communication connection is established within a predetermined time after suspending the data transmission; and
- canceling the data transmission, if it is determined that the other wireless communication connection is not established within the predetermined time.

16. The non-transitory computer-readable medium according to claim 8,
- wherein the interface is configured to perform short-distance wireless communication and long-distance wireless communication having a longer communicable distance than the short-distance wireless communication, and
- wherein the instructions, when executed, cause the wireless communication device to perform further operations comprising:
   - transmitting setting information from the wireless communication device to the external communication device by the short-distance wireless communication between the wireless communication device and the external device; and
   - establishing a long-distance wireless communication connection between the wireless communication device and the external device by using the transmitted setting information.

* * * * *